(12) United States Patent
Dielissen et al.

(10) Patent No.: US 8,072,893 B2
(45) Date of Patent: Dec. 6, 2011

(54) INTEGRATED CIRCUIT WITH DATA COMMUNICATION NETWORK AND IC DESIGN METHOD

(75) Inventors: John Dielissen, Weert (NL); Edwin Rijpkema, Nieuwerkerk A/D Ijssel (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 951 days.

(21) Appl. No.: 11/912,175

(22) PCT Filed: Apr. 20, 2006

(86) PCT No.: PCT/IB2006/051218
§ 371 (c)(1),
(2), (4) Date: Oct. 22, 2007

(87) PCT Pub. No.: WO2006/111931
PCT Pub. Date: Oct. 26, 2006

(65) Prior Publication Data
US 2008/0186983 A1   Aug. 7, 2008

(30) Foreign Application Priority Data
Apr. 21, 2005   (EP) .................................... 05103232

(51) Int. Cl.
*G01R 31/08* (2006.01)
(52) U.S. Cl. ........................................ 370/252; 370/351
(58) Field of Classification Search .................. None
See application file for complete search history.

(56) References Cited

U.S. PATENT DOCUMENTS

| 6,466,548 | B1 * | 10/2002 | Fitzgerald | 370/249 |
| 7,197,009 | B1 * | 3/2007 | Dispensa | 370/237 |
| 7,362,763 | B2 * | 4/2008 | Wybenga et al. | 370/395.1 |
| 2002/0087716 | A1 * | 7/2002 | Mustafa | 709/236 |
| 2004/0193709 | A1 * | 9/2004 | Selvaggi et al. | 709/224 |
| 2004/0252701 | A1 * | 12/2004 | Anandakumar et al. | 370/395.21 |
| 2004/0258099 | A1 * | 12/2004 | Scott et al. | 370/503 |

OTHER PUBLICATIONS

Dielissen J. et al: Concepts and Implementation of the Philips Network-on-Chip, Nov. 13, 2003, XP002330547.
Chandra V et al: An Interconnect Channel Design Methodology for High Performance Integrated Circuits, IEEE vol. 2, Feb. 16, 2004, pp. 1138-1143, XP010684819.
Caroloni L. P: Coping with Latency in SOC Design, IEEE Micro, Sep. 2002, pp. 24-35, XP002393174.
J. Dielissen, et al: Introduction of Flit Delay on Links, Philips Research, pp. 1-5.
Andrei Radulescu, et al: An Efficient On-Chip Network Interface Offering Guaranteed Services, Shared-Memory Abstraction, and Flexible Network Configuration, Philips Research, pp. 1-6.
E. Rijpkema, et al: Trade-offs in the Design of a Router with Both Guaranteed and Best-Effort Services for Network on Chip, IEEE Proc. Comput Digit Tech, May 16, 2003.
Antoine Jalabert, et al: X pipesCompiler: A Tool for Instantiating Application Specfic Networks on Chip, IEEE 2004, pp. 1-6.
Ramalingam Sridhar: System-on-Chip (SoC): Clocking and Synchronization Issues, IEEE VLSI Design VLSID 2004, Computer Society, pp. 1-8.

* cited by examiner

Primary Examiner — Phirin Sam

(57) ABSTRACT

An integrated circuit includes functional blocks and a data communication network having network stations interconnected via communication channels for communicating data packages between the functional blocks. Each data package includes N data elements having a data element with routing information for the network stations, N being an integer of at least two. The network stations include data routers and network interfaces, where each of the data routers is coupled to a functional block via a network interface. The data communication network includes first and second network stations interconnected through a first communication channel. The network includes M*N data storage elements, M being a positive integer, for introducing a delay of M*N cycles on the first communication channel.

12 Claims, 3 Drawing Sheets

INTEGRATED CIRCUIT WITH DATA COMMUNICATION NETWORK AND IC DESIGN METHOD

The present invention relates to an integrated circuit having a plurality of functional blocks interconnected via a data communication network.

Nowadays, most integrated circuits (ICs) are very large scale integration (VLSI) circuits having a large number of features that typically implement a large number of functions on board the IC. The various functions may be located in discrete functional blocks, e.g. system on chip (SoC) architectures. The interconnect of the functional blocks poses a design challenge, because the high clock speeds of modern ICs facilitate the processing of large amounts of data, which means that the interconnect of the IC must be capable of communicating large amounts of data between the functional blocks.

To facilitate flexible communication on the one hand and to limit the amount of wires required on the other hand, ICs may incorporate a data communication network, also referred to as a network on chip (NoC). Such networks typically comprise a plurality of network stations, each associated with a functional block, interconnected via communication channels, e.g. wires. The plurality of network stations include a plurality of data routers and a plurality of network interfaces, each data router being coupled to a functional block via a network interface. The data can be communicated over the network in the form of packages that include a mixture of data and routing instructions for the network stations. In networks facilitating duplex communication, a pair of network stations is typically interconnected via at least a pair of communication subchannels to facilitate the two-way communication.

A problem associated with communication channels, e.g. wires, on ICs is that the clock speed at which the IC can operate may be determined by the slowest communication channel, i.e. the channel exhibiting the largest data transfer delay. Several solutions for such a problem exist, see for instance Carloni et al.: Coping with latency in SoC design, IEEE Micro 5, Vol. 22, pages 24-35, IEEE 2002, in which a number of solutions are presented. A possible solution is to introduce a data storage element such as a latch into the slowest data communication channel. Consequently, the clock speed of the data communication part of the IC can be increased at the expense of an additional clock cycle for the communication along the slowest communication channel.

Unfortunately, such a solution cannot straightforwardly be applied to ICs communicating data between the functional blocks via an integrated network, especially when the nature of the communicated data differs per clock cycle; see E. Rijpkema et al.: Trade-offs in the design of a router with both guaranteed and best-effort services for networks on chip; IEE Proc.-Comput. Digit. Tech. 2003, page 1-9 (IEE proceedings online no. 20030830), for an example of such a network. Such a network operates on the principle that a network station such as a data router receives the routing data incorporated in the data packet during a predefined clock cycle. Delaying the communication to that router over a slow communication channel by a clock cycle to speed up the rest of the network would cause the routing data to arrive outside the predefined clock cycle, causing erroneous behaviour of the network.

The present invention seeks to improve the data communication speed of a network of an integrated circuit according to the opening paragraph.

According to an aspect of the invention, there is provided an integrated circuit a plurality of functional blocks and a data communication network comprising a plurality of network stations being interconnected via a plurality of communication channels for communicating data packages between the functional blocks, each data package comprising N data elements including a data element comprising routing information for the network stations, N being an integer of at least two, the plurality of network stations comprising a plurality of data routers and a plurality of network interfaces, each of the data routers being coupled to a functional block via a network interface, the data communication network comprising a first network station and a second network station interconnected through a first communication channel, the network comprising M*N data storage elements, M being a positive integer, for introducing a delay of M*N cycles on the first communication channel.

The invention is based on the realization that the correct operation of the network relies on the maintenance of the correct periodicity between the network stations. Because the data packages have a fixed size of N data elements, the communication of a complete package between two network stations takes N clock cycles, or N handshake driven data transfers in case of an asynchronous implementation of the network. The routing information, e.g. destination and required service type (e.g. best effort or guaranteed bandwidth) has a fixed position in the data package, e.g. the first data element (i.e. a header), although other data elements may (also) contain such information. Since a network station expects routing information to arrive periodically (i.e. after every N cycles), the introduction of a delay on the first communication channel (which typically is the slowest channel of the network) matching such a period, i.e. by delaying the whole data package rather than a single data element, the delayed data package is received by the receiving network station during the appropriate period, e.g. clock cycle.

Each communication channel may a comprise first subchannel between an input port of a first associated network station and an output port of a second associated network station and a second subchannel between an input port of the second associated network station and an output port of the first associated network station for enabling duplex communication between the two associated network stations. The M*N data elements may be distributed over the subchannels of the first communication channel.

In a preferred embodiment, the first network station is arranged to evaluate the routing information in a first cycle and the second network station is arranged to evaluate the routing information in a second cycle, the difference between the first cycle and the second cycle being A cycles; and the first subchannel of the first communication channel exhibits a delay of A cycles implemented by A data storage elements and the second subchannel exhibits a delay of B cycles implemented by B data storage elements, A and B being positive integers, with A+B=M*N.

The introduction of a phase shift in the routing evaluation phase for a one of the network stations in the network has the advantage that the number of delay elements in a data communication (sub)channel can be smaller than the number of data elements in a data package, thus improving the latency of that particular data communication (sub)channel. The drawback is that all communication to the phase-shifted network station has to run via the delayed communication channel to introduce the appropriate phase shift. This limitation can be avoided, however, by ensuring that any network path from a further network station being arranged to evaluate the routing information in the second cycle to the first network station comprises C delay elements, C being a positive integer with C modulo N=A; and any network path to the further network station from the first network station comprises D delay elements; B being a positive integer with D modulo N=B. This maintains the correct phase relation between the first network station and any other network station that operate on a different router information evaluation phase than the first network station, thus maintaining the optimal flexibility in the network.

In an alternative embodiment, each subchannel of the first communication channel comprises a delay introduced by ½*M*N data storage elements, with ½*M*N typically corresponding to the size of a data package. Consequently, since both paths of the duplex communication channel are likely to have similar lengths and similar delay characteristics, the partitioning of both subchannels allows for the improvement of the speed of the network in both communication directions.

Preferably, M=1 in order to minimize the number of required delay elements, which will minimize the delay introduced on the first communication channel.

In a synchronous implementation, the IC further comprises a clock signal generator, the plurality of network stations and the M*N storage elements being responsive to the clock signal generator, to ensure that no data conflicts can arise between the data routers and the M*N storage elements.

Each network station may comprise a first memory element and a second memory element associated with a communication port of said network station, the first memory element being arranged to store routing information from a data package requiring a first service level associated with said communication port and the second memory element being arranged to store routing information from a data package requiring a second service level associated with said communication port. Such an implementation allows for the interleaving of packages requiring different service levels, e.g. best effort and guaranteed bandwidth service levels.

According to a further aspect of the invention, there is provided a method of designing an integrated circuit comprising a plurality of functional blocks and a data communication network comprising a plurality of network stations being interconnected via a plurality of communication channels for communicating data packages between the functional blocks, each data package comprising N data elements including a data element comprising routing information for the network stations, N being an integer of at least two, the plurality of network stations comprising a plurality of data routers and a plurality of network interfaces, each of the data routers being coupled to a functional block via a network interface; the method comprising identifying a first communication channel between a first network station and a second network station that has a data transfer delay exceeding a predefined delay threshold; and inserting M*N data storage elements into the data communication network, M being a positive integer, for introducing a delay of M*N cycles on the first communication channel. Such a method facilitates the design of an integrated circuit of the present invention.

In a preferred embodiment, each communication channel comprises a first subchannel between an input port of a first associated network station and an output port of a second associated network station and a second subchannel between an input port of the second associated network station and an output port of the first associated network station for enabling duplex communication between the two associated network stations; and the first network station being arranged to evaluate the routing information in a first cycle and the second network station being arranged to evaluate the routing information in a second cycle, the difference between the first cycle and the second cycle being A cycles, the method further comprising inserting A data storage elements into the first subchannel of the first communication channel for introducing a delay of A cycles onto said first subchannel; and inserting B data storage elements into the second subchannel of the first communication channel for introducing a delay of B cycles onto said second subchannel; A and B being positive integers, with A+B=M*N. Such a method facilitates the design of a preferred embodiment of the integrated circuit of the present invention.

The invention is described in more detail and by way of non-limiting examples with reference to the accompanying drawings, wherein.

It should be understood that the Figures are merely schematic and are not drawn to scale. It should also be understood that the same reference numerals are used throughout the Figures to indicate the same or similar parts.

Figure 1:
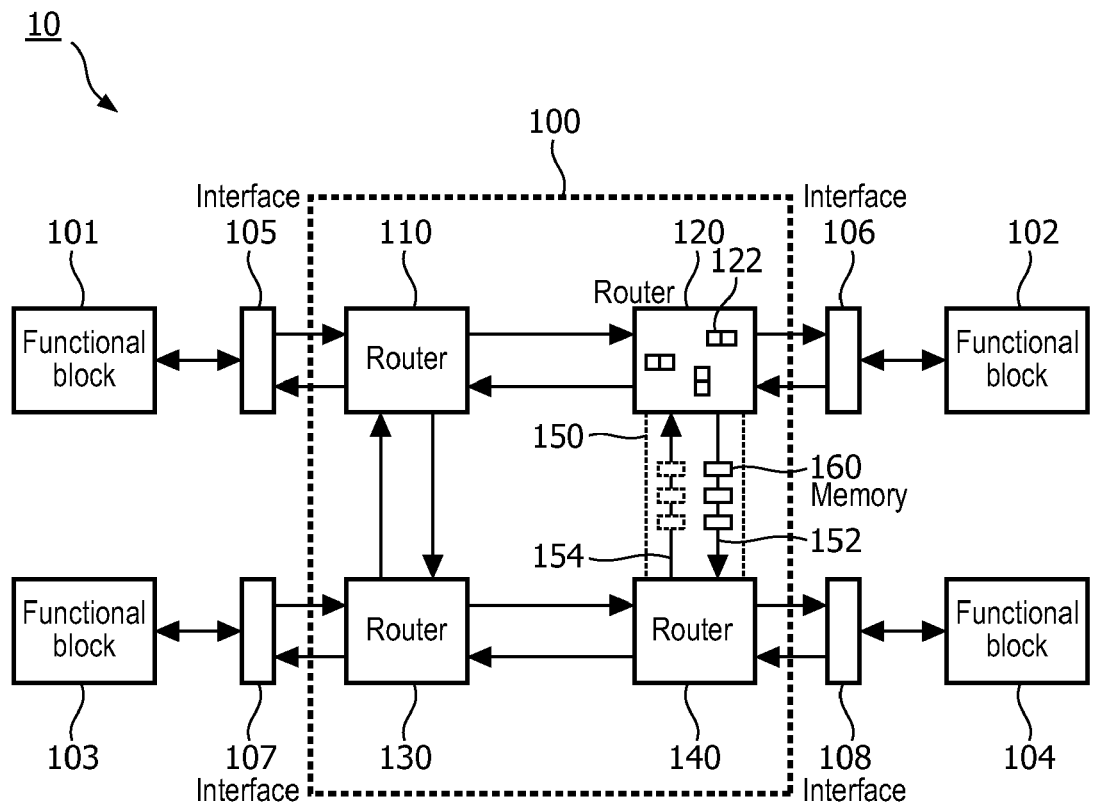
FIG. 1 shows an embodiment of an IC of the present invention.

FIG. 1 shows an integrated circuit (IC) 10 according to an embodiment of the present invention. The IC 10 has four functional blocks 101-104, e.g. processing units, which are interconnected via a data communication network 100 including data routers 110, 120, 130, 140, which respectively are coupled to the functional blocks 101-104 via respective network interfaces 105-108. The data routers 110, 120, 130, 140 and the network interfaces 105-108 comprise the network stations of the data communication network 100. Exemplary embodiments of such data routers and network interfaces can for instance be found in: "An efficient On-Chip Network Interface Offering Guaranteed Services, Shared Memory Abstraction and Flexible Network Configuration" by Radulescu et al.; Proceedings of Design, Automation and Test Conference in Europe, February 2004, and in E. Rijpkema et al.: Trade-offs in the design of a router with both guaranteed and best-effort services for networks on chip; IEE Proc.-Comput. Digit. Tech. 2003, page 1-9 (IEE proceedings online no. 20030830) as well as in the relevant references therein, the relevant passages thereof being incorporated by reference.

The network stations of the data communication network 100 are interconnected via a plurality of data communication channels 150. The communication channels 150 may comprise one or more wires, e.g. data buses. The data communication network 100 is configured to allow flexible communication of data streams between the functional blocks 101-104. Typically, such a data stream comprises one of more data packages, with each data package comprising N data elements, with N being an integer having a value of at least 2. At least one of the N data elements in a package, e.g. the first data element, comprises routing instructions for the destination network station. Such data packages are sometimes referred to as flow instruction units (flits).

The data streams may be communicated over the network 100 using known communication techniques such as store and forward routing, in which a complete data stream is stored in a data router before it is forwarded to its next destination, or wormhole routing, in which the data routers can send a stored data package to its next destination before the complete data stream has been received. The latter technique has the advantage that the data routers 110, 120, 130, 140 need less storage capacity but both techniques are equally feasible, and other techniques may be used as well.

The data network 100 shown in FIG. 1 is a duplex network, i.e. it allows simultaneous data communication in two directions. It is emphasized, however, that the present application is equally applicable to simplex networks, i.e. networks that do not support simultaneous two-way communication. To facilitate the duplex communication over data network 100, each communication channel 150 comprises a first subchannel 152 and a second subchannel 154 between respective inputs and outputs of two neighbouring network stations, e.g. data routers 120 and 140. This facilitates time-division multiple access (TDMA) data communication, for instance of a guaranteed bandwidth and a best effort service. To this end, each network station in the data communication network 100 has a plurality of memories, each comprising a first memory element and a second memory element, e.g. memory 122 in data router 120, associated with a communication port, i.e. an input port or an output port of the data router, or more precisely, associated with a service level of a communication via that communication port. Obviously, the plurality of memories may be implemented as a single memory having enough storage to keep track of each input or output port of the network station, as will be explained below by means of a communication between two data routers by way of example only. It will be appreciated that the same teachings can be applied to communications between a data router and a network interface or to communications between a network interface and a functional block without departing from the teachings of the present invention.

Typically, the header of a first data package will comprise information about the destination of the data package as well as the service level of the data package, e.g. guaranteed bandwidth or best effort service. The service level will be flagged by setting a bit in the appropriate memory element of the destination output port of the data router. For subsequent data packages having the same service level, the data router will know that these data packages belong to a data stream in progress because the appropriate bit has been stored in the associated memory element. The last data package of the data stream contains an indicator causing the data router to reset said bit. Such a mechanism allows interleaving of data packages of two data streams over a single communication channel.

In FIG. 1, the communication channel 150 between data routers 120 and 140 has been identified as the communication channel in the network 100 exhibiting a data transfer delay exceeding a predetermined delay threshold. Such an identification can be made at the IC design stage by subjecting the design to a simulation of the delay behaviour of the IC 10 using available timing behaviour simulation tools. To avoid having to limit the communication speed, e.g. the clock speed, of the data communication network 100 in accordance with the delay characteristics of the communication channel 150 between two network stations, e.g. data routers 120 and 140, this communication channel (which will be referred to as the slow communication channel 150) is equipped with M*N data storage elements to introduce a delay of M*N cycles onto the communication channel, with N corresponding to the size of a data package, thus allowing an increase of the maximum communication frequency of the data network 100 at the expense of the introduction of a delay of a single data package, i.e. the number of clock cycles it takes to communicate such a data package, on the slow communication channel 150.

The network 100 shown in FIG. 1 is arranged to communicate data packages with size N=3. Other values of N are equally feasible. The first subchannel 152 of the slow communication channel 150 is extended with N=3 data storage elements 160. Optionally, the second subchannel 154 of the slow communication channel 150 is also extended with N=3 data storage elements 160, in which case M=2. Since the first subchannel 152 and the second subchannel 154 typically will be in each others vicinity, their respective delay characteristics typically will be similar, thus requiring the introduction of data storage elements 160 on both subchannels. However, in cases where the respective subchannels exhibit different delay characteristics, for instance because the subchannels have different lengths or because of the nature of the timing techniques used, e.g. waterfall clocking, the introduction of N data elements 160 on only one of the subchannels can be sufficient, in which case M=1.

It will be appreciated that the physical placement of the data storage elements 160 on the subchannels 152 and 154 is by way of example only; an implementation where the data storage elements 160 are integrated in the associated network stations, e.g. data router 120 or data router 140 is equally feasible. It will be appreciated that the same teachings can be applied to communications between a data router and a network interface or to communications between a network interface and a functional block without departing from the teachings of the present invention. The same applies to the other embodiments of the data communication network 100, e.g. the embodiments shown in FIGS. 3 and 5. The data storage elements 160 may be a pipeline or a buffer of latches or flipflops, and may be implemented using synchronous or asynchronous storage elements. In FIG. 1, the data storage elements 160 are responsive to the same clock signal (not shown) as the network stations including data routers 110, 120, 130, 140 and network interfaces 105-108.

Figure 2:
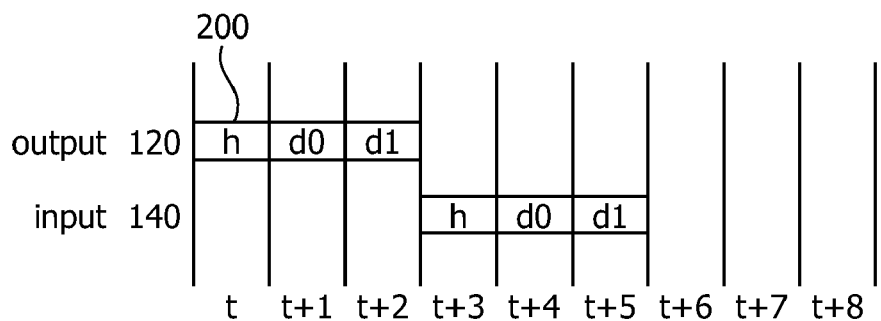
FIG. 2 shows the timing behaviour along a delayed communication channel of said IC.

FIG. 2 shows the timing behaviour of the communication along the slow channel 150 extended with 3 data storage elements 160 on the first subchannel 152 interconnecting an output port of data router 120 with an input port of the data router 140. At clock cycle t, the data router 120 employing wormhole routing receives the first data element h of a data package (indicated by the bold box) having a size of 3 data elements. The subsequent data elements d0 and d1 of this data package are received by the data router 120 at respective clock cycles t+1 and t+2. The data routers 110, 120, 130, 140 are all configured to periodically evaluate the content of a received data package, that is after every N clock cycles for a data package having a size N data elements. In the embodiment of the IC 10 shown in FIG. 1, all the data routers 110, 120, 130, 140 perform this operation simultaneously, i.e. at the same clock cycle, which is clock cycle t plus every Nth clock cycle afterwards, i.e. at t+3, t+6 and so on, at which the arrival of a header h of a new data package is expected. Such a periodical checking mechanism by a data router may for instance be implemented using modulo N counters. Consequently, it is essential that the headers of the data packages do not arrive at any data router 110, 120, 130, 140 outside such an evaluation clock cycle.

In line with the principle of wormhole routing, data router 120 starts sending the data package upon its complete receipt, i.e. at clock cycle t+3 via the first subchannel 152 of the slow communication channel 150. At this point, it is emphasized that data elements sent via a non-delayed communication channel will arrive at the destination data router in the same clock cycle as they were sent. However, due to the presence of N=3 data storage elements 160 in the first subchannel 152 of the slow communication channel 150, the first data storage element 160 receives the header h at t+3, passes it on to the second data storage element 160 at t+4, which passes it on to the third data storage element 160 at t+5, which finally passes it on to the data router 160 at t+6, which is in phase with the header evaluation cycle of the data routers 110, 120, 130, 140 in the data network 150. This ensures the correct routing of the data package by the data router 140.

In the embodiment of IC 10 according to the present invention as shown FIG. 3, the data router 140 is configured to evaluate the header of a data package A clock cycles later (or B cycles earlier) than the other data routers 110, 120, 130 in the data network 100, with N corresponding to the number of data elements in a data package and A, B being positive integers with A+B=M*N. Typically, A modulo N and B modulo N are not equal to zero.

Figure 3:
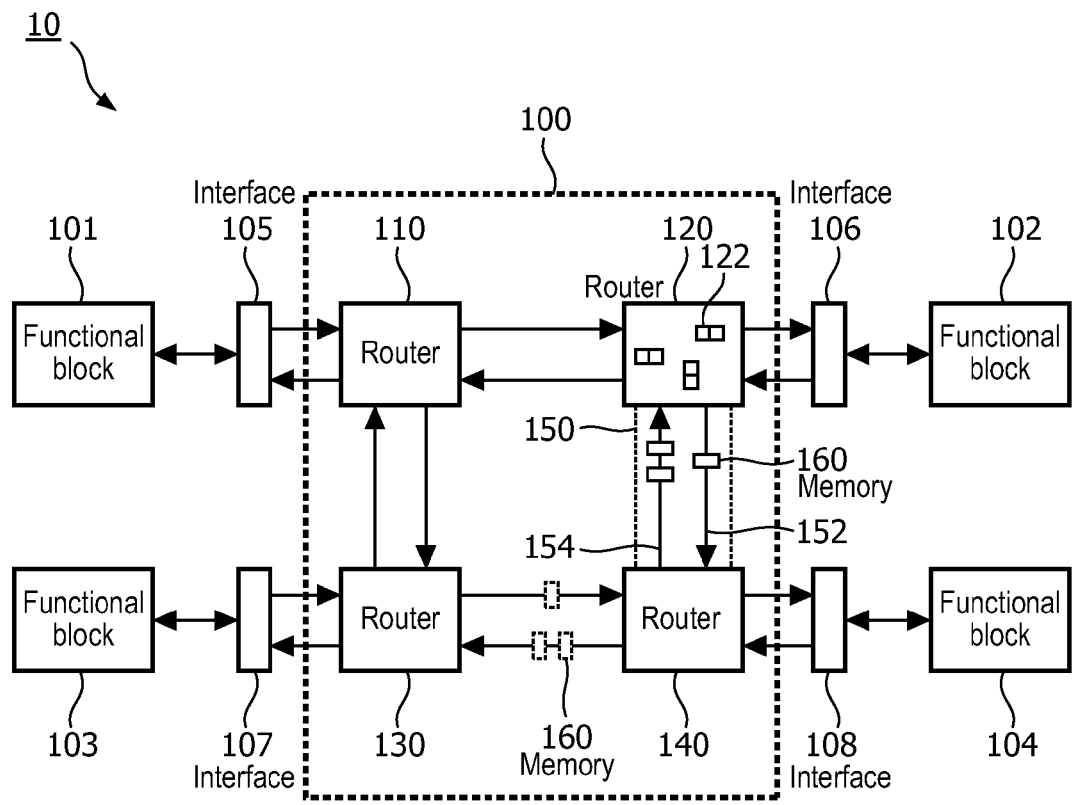
FIG. 3 shows another embodiment of an IC of the present invention.

In FIG. 3, M=1, N=3, A=1 and B=2 by way of example only. In other words, the data router 140 has a phase-shifted routing information evaluation cycle compared to the other data routers in the data network 100. To ensure that the routing information is correctly interpreted, i.e. to ensure that this information arrives at any data router during its appropriate clock cycle, two possible implementations can be chosen. In a first implementation, all communication to and from the phase-shifted data router 140 is routed through the slow communication channel 150. Consequently, only the slow communication channel 150 requires the introduction of M*N data storage elements over its subchannels 152 and 154. The drawback of this implementation is that the flexibility of the data communication network 100 is reduced.

In the preferred implementation, any network path from a further network station being arranged to evaluate the routing information in the second cycle to the first network station comprises C delay elements, C being a positive integer with C modulo N=A, and any network path to the further network station from the first network station comprises D delay elements; B being a positive integer with D modulo N=B. This ensures that the correct phase relation between clock cycle and routing information evaluation is maintained throughout the whole data communication network 100. For instance, in FIG. 3, C=A and B=D, with C data elements 160 being introduced in the subchannel 152 between the output port of data router 130 and the input port of data router 140 and with D data elements 160 being introduced in the subchannel 154 between the input port of data router 130 and the output port of data router 140.

In other words, every communication channel 150 between two network stations exhibiting a phase-shifted routing information cycle with respect to each other should incorporate the appropriate number of data storage elements 160 to implement the number of cycles to which the phase shift corresponds. In FIG. 3, this means that all subchannels connected to an input port of the data router 140 are extended with A data storage elements 160 to introduce a delay of A cycles on the communication directed towards the data router 140, and all subchannels connected to an output port of the data router 140 are extended with B data storage elements 160 to introduce a delay of B cycles on the communication originating from the data router 140. Since A+B=M*N, each communication channel 150 to which data router 140 is connected incorporates M*N data storage elements 160, thus ensuring the introduction of a delay of exactly M data packages on a communication loop between two neighbouring data routers.

Figure 4:
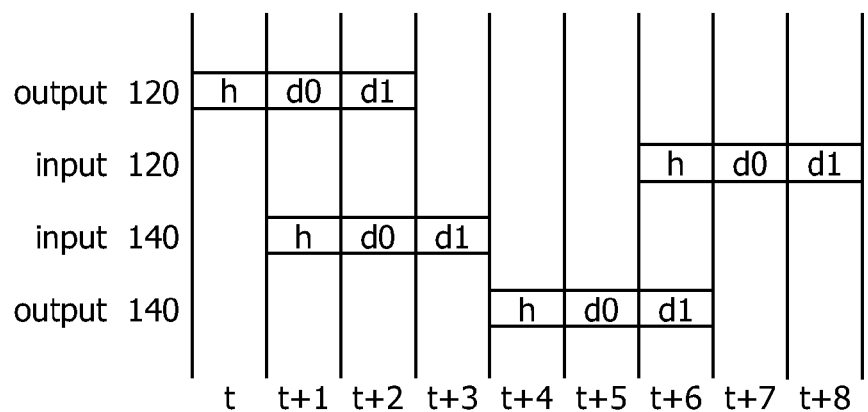
FIG. 4 shows the timing behaviour along a delayed communication channel of said IC.

This is explained in more detail in FIG. 4, where a data package consisting of data elements h, d0 and d1 is sent from data router 120 to data router 140 and back again in the network of IC 10 as shown in FIG. 3. The routing information evaluation clock cycles for data routers 120 and 140 are indicated by bold vertical lines at the beginning of such a cycle. In other words, data router 120 evaluates the routing information of received data packages at t, t+3, t+6 and so on, whereas data router 140 evaluates the routing information of received data packages at t+1, t+4, t+7 and so on. Data router 120 sends data element h at T=t to data router 140. At T=t, data element h is received by data storage element 160 in the first subchannel 152, which stores the data element h and sends it to the data router 140 at T=t+1, which receives the data element h during the same clock cycle and evaluates the routing information comprised in header h.

After the data router 140 has received data element d0 at T=t+2 and data element d1 and T=t+3, i.e., after the data router 140 has received the complete data package, the data router 140 sends the first data element of the data package to the data router 120 via the second subchannel 154. Due to the presence of two data storage elements 160 on the second subchannel 154, the first data element h is received by the data router 120 at T=t+6, i.e. during a cycle at which the data router 120 is scheduled to evaluate the routing information, with the other two data elements d0 and d1 respectively arriving at the subsequent cycles t+7 and t+8. It will be recognized that the data storage elements 160 in the subchannels 152 and 154 operate as phase shifters to ensure that routing information is evaluated at the right time in each data router phase domain. The application of phase shifting techniques has the advantage that the delay introduced on the individual subchannels 152, 154 can be less than a full data package, thus improving the performance of the slow communication channel 150 compared to the solution presented in FIG. 1.

At this point, it will be appreciated that the number of different phase domains can be further extended without departing from the teachings of the present invention. It is reiterated that although the exemplary implementations of the data storage elements is given on a communication channel between two data routers, implementations on channels between other types of network stations, e.g. between a data router and a network interface, are equally feasible.

Figure 5:
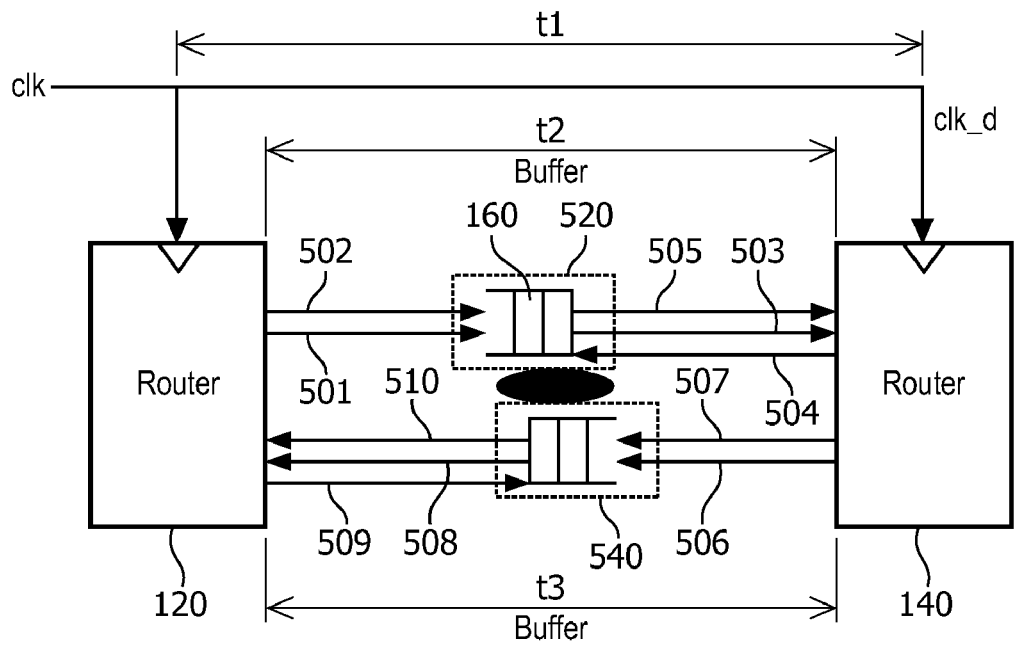
FIG. 5 shows yet another embodiment of an IC of the present invention including its timing behaviour.
Figure 5:
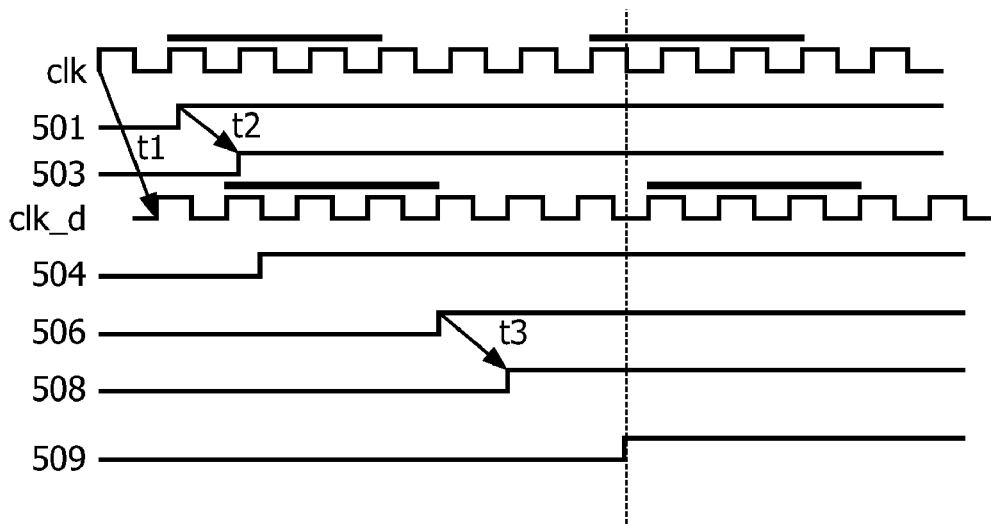

FIG. 5 shows an asynchronous implementation of a delayed duplex communication channel 150 between two network stations, e.g. data routers 120 and 140, which is robust against clock skew. The data routers 120 and 140 are triggered by clock signal CLK. However, due to the fact that the clock signal has to travel over a longer wire to data router 140 than to data router 120, data router 140 receives a delayed clock signal CLK_d, with a delay of t1 with respect to the clock signal CLK received by data router 120. In completely synchronous data communication networks 100, this can cause communication errors, because a data package sent by data router 140 at clock cycle t to data router 120 or the first delay element 160 over a slow communication channel 150 between the data routers 120 and 140 may arrive at its destination at cycle t+1 rather than at cycle t. As previously explained, this will cause the routing information to arrive at the data router 120 outside its routing information evaluation cycle, which will likely cause the loss of the information due to a routing error.

This risk can be reduced by implementing the M*N data storage elements 160 as asynchronous FIFO buffers 520 and 540 on the first subchannel 152 and the second subchannel 154 respectively between data routers 120 and 140. This implementation is insensitive to clock skew, at least within certain limits. To improve the robustness against clock skew of the asynchronous FIFO buffers 520 and 540, the buffers may include slightly more than the M*N data storage elements, as will be explained in more detail below.

The asynchronous FIFO buffers 520 and 540 have communication behaviour independent of the clock CLK; the data is rippled through the FIFO buffers 520 and 540 based on handshake protocols. Such behaviour is usually quicker than synchronous communication because the latter is dominated by the slowest path in the synchronous communication network, as previously explained.

A communication of a data package from data router 120 to FIFO buffer 520 is initiated by a handshake validation signal 501 followed by synchronous data communication 502 of the data elements of a data package having size N; this communication is governed by data router 120, which is responsive to clock signal CLK. The data elements take a time period t2 to ripple through FIFO buffer 520, after which a handshake request 503 is sent to the data router 140. The receipt of an initial handshake request initializes data router 140 and triggers the data router 140 to accept the data communication by sending an acknowledge signal 504 to the FIFO buffer 540, which triggers the data communication 505. The data router 140 will remain initialized until the data stream of data packages has been received completely. The data package receipt periods of data routers 120 and 140 are indicated by the bold horizontal lines over the clock signals clk and clk_d respectively. The data router 140 receives the data communication synchronously and sends the data package synchronously, i.e. one data element per clock cycle, to FIFO buffer 540 N clock cycles after receiving the request signal 503, in accordance with a wormhole routing approach, by sending a handshake validation signal 506 and data communication 507 to the FIFO buffer 540. After a period t3, i.e. the time it takes the data elements to ripple through the FIFO buffer 540, the FIFO buffer 540 sends a handshake request signal 508 to data router 120.

Crucially, because data router 120 has already been initialized, i.e. it is already engaged in communicating a data stream to data router 140, data router 120 will only send an acknowledge signal 509 to such a handshake request to enable communication 510 at the beginning of a routing information evaluation cycle of data router 120, as indicated by the vertical dashed line. Alternatively, if the transmission of the data stream from data router 120 to data router 140 had completed prior to the handshake request 508 from FIFO buffer 540 to data router 120, this request would initialize the data router 120. In both cases, the receipt of the routing information in the correct timeslot of data router 120 is ensured despite the clock skew on the clock signal triggering the data routers 120 and 140. In case the clock skew between data router 120 and data router 140 is substantial, the data router 140 may send a first data element of a next data package to the FIFO buffer 540 before this buffer has received the acknowledge signal 509. In such a scenario, the FIFO buffer 509 must be capable of storing more than M*N data elements to avoid the loss of data stored in the FIFO buffer 509. This can be realized by adding one or more data storage elements to the M*N data storage elements as overwrite protection.

An IC 10 comprising a data communication network 100 according to the present invention can be designed using an IC design method modified as follows. After designing a first version of the IC 10, which can be done using well-known IC design tools, and which will not be further explained for that reason, an evaluation step is performed in which a first communication channel between a network station and a second network station having a data transfer delay exceeding a predefined delay threshold is identified. Consequently, the design of the data communication network 100 is modified according to the teachings of the present invention by inserting M*N data storage elements into the network, M being a positive integer, for introducing a delay of M*N cycles on the first communication channel. This allows for an increase of the maximum clock speed at which the data communication network 100 can operate.

The insertion step may comprise inserting A data storage elements into the first subchannel (152) of the first communication channel (150) for introducing a delay of A cycles onto said first subchannel and inserting B data storage elements into the second subchannel (154) of the first communication channel (150) for introducing a delay of B cycles onto said second subchannel with A and B being positive integers and with A+B=M*N to create a phase-shifted data communication network 100 as outlined in FIGS. 3 and 4 and their detailed description.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. An integrated circuit comprising:
a plurality of functional blocks; and
a data communication network comprising a plurality of network stations being interconnected via a plurality of communication channels for communicating data packages between the functional blocks, each data package comprising N data elements including a data element comprising routing information for the network stations, N being an integer of at least two, the plurality of network stations comprising a plurality of data routers and a plurality of network interfaces, each of the data routers being coupled to a functional block via a network interface, the data communication network comprising a first network station and a second network station interconnected through a first communication channel, the data communication network further comprising M*N data storage elements, M being a positive integer, the data communication introducing a delay of M*N cycles on the first communication channel when the data communication network identifies the first communication channel as having a data transfer delay exceeding a predefined delay threshold.

2. The integrated circuit as claimed in claim 1, wherein each communication channel of the plurality of communication channels comprises:
a first subchannel between an input port of a first associated network station and an output port of a second associated network station; and
a second subchannel between an input port of the second associated network station and an output port of the first associated network station for enabling duplex communication between the two associated network stations.

3. The integrated circuit as claimed in claim 2, wherein the M*N data storage elements are distributed over the first subchannel and the second subchannel of the first communication channel.

4. An integrated circuit comprising:
a plurality of functional blocks; and
a data communication network comprising a plurality of network stations being interconnected via a plurality of communication channels for communicating data packages between the functional blocks, each data package comprising N data elements including a data element comprising routing information for the network stations, N being an integer of at least two, the plurality of network stations comprising a plurality of data routers and a plurality of network interfaces, each of the data routers being coupled to a functional block via a network interface, the data communication network comprising a first network station and a second network station interconnected through a first communication channel, the data communication network further comprising M*N data storage elements, M being a positive integer, for introducing a delay of M*N cycles on the first communication channel, wherein each communication channel of the plurality of communication channels comprises:

a first subchannel between an input port of a first associated network station and an output port of a second associated network station; and a second subchannel between an input port of the second associated network station and an output port of the first associated network station, and wherein the first network station is arranged to evaluate the routing information in a first cycle and the second network station is arranged to evaluate the routing information in a second cycle, the difference between the first cycle and the second cycle being A cycles; and the first subchannel of the first communication channel exhibits a delay of A cycles implemented by A data storage elements and the second subchannel exhibits a delay of B cycles implemented by B data storage elements, A and B being positive integers, with A+B=M*N.

5. The integrated circuit as claimed in claim 4, wherein any network path from a further network station being arranged to evaluate the routing information in the second cycle to the first network station comprises C delay elements, C being a positive integer with C modulo N=A; and any network path to the further network station from the first network station comprises D delay elements; D being a positive integer with D modulo N=B.

6. The integrated circuit as claimed in claim 1, wherein M=1.

7. An integrated circuit comprising:

a plurality of functional blocks; and a data communication network comprising a plurality of network stations being interconnected via a plurality of communication channels for communicating data packages between the functional blocks, each data package comprising N data elements including a data element comprising routing information for the network stations, N being an integer of at least two, the plurality of network stations comprising a plurality of data routers and a plurality of network interfaces, each of the data routers being coupled to a functional block via a network interface, the data communication network comprising a first network station and a second network station interconnected through a first communication channel, the data communication network further comprising M*N data storage elements, M being a positive integer, for introducing a delay of M*N cycles on the first communication channel, wherein each communication channel of the plurality of communication channels comprises:

a first subchannel between an input port of a first associated network station and an output port of a second associated network station; and a second subchannel between an input port of the second associated network station and an output port of the first associated network station, and wherein the first subchannel and the second subchannel of the first communication channel each comprise a delay introduced by ½*M*N data storage elements.

8. The integrated circuit as claimed in claim 1, further comprising a clock signal generator, the plurality of network stations and the M*N data storage elements being responsive to the clock signal generator.

9. The integrated circuit as claimed in claim 1, wherein each network station comprises a first memory element and a second memory element associated with a communication port of said network station, the first memory element being arranged to store routing information from a data package requiring a first service level associated with said communication port and the second memory element being arranged to store routing information from a data package requiring a second service level associated with said communication port.

10. A method of designing an integrated circuit comprising a plurality of functional blocks, and a data communication network comprising a plurality of network stations being interconnected via a plurality of communication channels for communicating data packages between the functional blocks, each data package comprising N data elements including a data element comprising routing information for the network stations, N being an integer of at least two, the plurality of network stations comprising a plurality of data routers and a plurality of network interfaces, each of the data routers being coupled to a functional block via a network interface; the method comprising the acts of:

identifying a first communication channel between a first network station and a second network station that has a data transfer delay exceeding a predefined delay threshold; and in response to the identifying act, inserting M*N data storage elements into the data communication network, M being a positive integer, for introducing a delay of M*N cycles on the first communication channel.

11. A method of designing an integrated circuit comprising a plurality of functional blocks, and a data communication network comprising a plurality of network stations being interconnected via a plurality of communication channels for communicating data packages between the functional blocks, each data package comprising N data elements including a data element comprising routing information for the network stations, N being an integer of at least two, the plurality of network stations comprising a plurality of data routers and a plurality of network interfaces, each of the data routers being coupled to a functional block via a network interface; the method comprising the acts of:

identifying a first communication channel between a first network station and a second network station that has a data transfer delay exceeding a predefined delay threshold; and inserting M*N data storage elements into the data communication network, M being a positive integer, for introducing a delay of M*N cycles on the first communication channel, wherein each communication channel comprises a first subchannel between an input port of a first associated network station and an output port of a second associated network station and a second subchannel between an input port of the second associated network station and an output port of the first associated network station for enabling duplex communication between the two associated network stations; and the first network station being arranged to evaluate the routing information in a first cycle and the second network station being arranged to evaluate the routing information in a second cycle, the difference between the first cycle and the second cycle being A cycles, the method further comprising the acts of:

inserting A data storage elements into the first subchannel of the first communication channel for introducing a delay of A cycles onto said first subchannel; and inserting B data storage elements into the second subchannel of the first communication channel for introducing a delay of B cycles onto said second subchannel; A and B being positive integers, with A+B=M*N.

12. The integrated circuit of claim 4, wherein the M*N data storage elements are distributed over the first subchannel and the second subchannel of the first communication channel.

* * * * *